US011852207B2

United States Patent
Mambretti et al.

(10) Patent No.: US 11,852,207 B2
(45) Date of Patent: Dec. 26, 2023

(54) ASSEMBLY OF AT LEAST TWO BRAKE PADS AND AT LEAST ONE SPRING (71) Applicant: BREMBO S.p.A., Curno (IT)

(72) Inventors: Mauro Mambretti, Curno (IT); Andrea Mecocci, Curno (IT); Alberto Pendesini, Curno (IT); Giuseppe Spigapiena, Curno (IT); Alberto Bosis, Curno (IT)

(73) Assignee: Brembo S.p.A., Bergamo (IT)

( * ) Notice: Subject to any disclaimer, the term of this patent is extended or adjusted under 35 U.S.C. 154(b) by 204 days.

(21) Appl. No.: 17/416,062

(22) PCT Filed: Dec. 20, 2019

(86) PCT No.: PCT/IB2019/061201
§ 371 (c)(1),
(2) Date: Jun. 18, 2021

(87) PCT Pub. No.: WO2020/129012
PCT Pub. Date: Jun. 25, 2020

(65) Prior Publication Data
US 2022/0056970 A1 Feb. 24, 2022

(30) Foreign Application Priority Data

Dec. 20, 2018 (IT) .......................... 102018000020527
Dec. 13, 2019 (IT) .......................... 102019000023940

(51) Int. Cl.
F16D 65/40 (2006.01)
F16D 65/097 (2006.01)
(Continued)

(52) U.S. Cl.
CPC ....... *F16D 65/0972* (2013.01); *F16D 55/226* (2013.01); *F16D 65/0006* (2013.01);
(Continued)

(58) Field of Classification Search
CPC .... F16D 65/0006; F16D 65/12; F16D 65/226; F16D 65/0972; F16D 65/0068; F16D 2055/0016; F16D 2127/02
(Continued)

(56) References Cited

U.S. PATENT DOCUMENTS 6,719,105 B1 4/2004 Wemple
7,784,591 B2 * 8/2010 Franz .................. F16D 65/0972
188/73.38
(Continued)

FOREIGN PATENT DOCUMENTS

DE 102017222639 A1 8/2018
DE 102017204696 A1 9/2018
(Continued)

OTHER PUBLICATIONS

European Patent Office, International Search Report with Written Opinion, dated Mar. 6, 2020, 12 pages, European Patent Office, Rijswijk, Netherlands.

*Primary Examiner* — Christopher P Schwartz
(74) *Attorney, Agent, or Firm* — Marshall & Melhorn, LLC (57) ABSTRACT An assembly has two pads having a support plate and a friction material coating, each pad being accommodated in a pocket of a caliper and positionable on a side of a brake disc. At least one spring applies an elastic bias on the pads so as to elastically bias the pads away from the brake disc. The support plate has a plate coupling portion having an inner lower edge, facing the brake disc in a radially inward direction or towards the rotation axis, an inner upper edge, facing the brake disc in a radially outward direction or opposite to the rotation axis, the inner upper edge continuing on a direct upper surface according to the axial direction (A-A), forming an upper spring-coupling plate portion edge.

(Continued)

The spring is always in contact exclusively with the inner lower edge and the upper spring-coupling plate portion edge.

17 Claims, 10 Drawing Sheets

(51) Int. Cl.
*F16D 55/226* (2006.01)
*F16D 65/00* (2006.01)
*F16D 65/52* (2006.01)
*F16D 65/02* (2006.01)
*F16D 55/00* (2006.01)
*F16D 127/02* (2012.01)

(52) U.S. Cl.
CPC .......... *F16D 65/52* (2013.01); *F16D 65/0068* (2013.01); *F16D 65/02* (2013.01); *F16D 2055/0016* (2013.01); *F16D 2127/02* (2013.01)

(58) Field of Classification Search
USPC ............ 188/73.36–73.38, 250 B, 250 G, 258
See application file for complete search history.

(56) References Cited

U.S. PATENT DOCUMENTS

| | | | |
|---|---|---|---|
| 9,062,729 | B2 | 6/2015 | Chelaidite |
| 10,400,838 | B2 | 9/2019 | Reynolds et al. |
| 2004/0104086 | A1* | 6/2004 | Katoh ................ F16D 65/0975 |
| | | | 188/73.38 |
| 2019/0338816 | A1* | 11/2019 | Denhard ............... F16D 55/228 |

FOREIGN PATENT DOCUMENTS

| | | |
|---|---|---|
| JP | 2012072830 A | 4/2012 |
| JP | 2012189188 A | 10/2012 |
| WO | WO/0233282 A1 | 4/2002 |

* cited by examiner

ASSEMBLY OF AT LEAST TWO BRAKE PADS AND AT LEAST ONE SPRING

CROSS-REFERENCE TO RELATED APPLICATIONS

This application is a National Phase Application of PCT International Application No. PCT/IB2019/061201, having an International Filing Date of Dec. 20, 2019, which claims priority to Italian Application No. 102018000020527 filed Dec. 20, 2018, and to Italian Application No. 102019000023940 filed Dec. 13, 2019, each of which is hereby incorporated by reference in its entirety.

FIELD OF THE INVENTION

The present invention relates to an assembly comprising at least two pads and at least one spring for elastically retaining and biasing the pads in a disc brake caliper, as well as to a caliper comprising such an assembly and a disc brake equipped with such an assembly.

BACKGROUND ART

Disc brake springs are known which consist of a central portion and two end portions, in which the end portions rest against the pads so as to bias the pads elastically away from each other to ensure a separation of the pads from the brake disc after each braking operation.

The known springs are thus used to obtain a three-fold action:
  to reduce the vibrations of the pads;
  to distance the pads from the brake disc in order to reduce or eliminate a residual braking torque (residual torque) due to undesired contacts between the pads and the brake disc with the brake deactivated;
  to obtain uniform wear of the friction linings of the pads.

Usually, the known springs are kept in their operating position by fixing the central portion of the springs to the caliper.

In particular, the springs of the prior art generally comprise one or more connecting appendages, formed at the central portion of the expansion spring, adapted to connect the springs to the caliper at coupling portions formed on the caliper.

For example, document DE102017204696 shows a solution of this type.

Such a fixing requires to design the springs specifically for the caliper for which they are intended to be connected.

Moreover, these known solutions, by relieving the reaction of the elastic bias applied on the pads at least partially in the caliper body, can determine an unbalanced, or in any case not symmetrical, elastic action on opposite pads, thus also generating, under particular conditions, uneven pad displacement and therefore at least initially uneven applications of the braking actions applied on the brake disc, at least at the beginning of the braking action of the vehicle.

Furthermore, such a configuration requires to allocate a portion of the caliper to allow the coupling portion to connect the springs to the caliper.

Moreover, the springs of the prior art usually abut against an apical portion of the pads, and therefore transmit a direct distancing force to the pads at the top of the pads, top which is understood as the radially outer edge with respect to the rotation axis of the brake disc.

For the sake of convenience, in brake systems, reference is made to the rotation axis of the brake disc, albeit virtual in the case of components removed from the vehicle. Each axis parallel to the brake disc rotation axis is named axial direction A-A, each direct axis orthogonal to the axial direction and incident with the brake disc rotation axis is named radial direction R-R and each direction orthogonal to both the axial and radial direction is named circumferential direction C-C which punctually forms a tangential direction T-T.

The action of the spring on the outer radial edge of the pad causes uneven and sometimes incomplete detachment between brake pads and brake disc, which determines a residual torque, unplanned pad positioning and orientation and uneven pad wear. However, this elastic action mainly at the top of the pads tends to position the pad itself not facing parallel to the braking surface of the disc and not perfectly facing the rear or plate surface of the thrust means, typically hydraulic pistons, thus causing an initial transient settling of the pad at each start of braking action and sometimes a non-optimal settling of the pad to the brake disc or piston which applies the braking thrust.

Therefore, in the sector, the need is felt for a brake pad and spring assembly solution which distances them away from the brake disc capable of applying an elastic bias with direct resultant in a direction parallel to the direction of the brake disc rotation axis.

In particular, the need is felt to prevent the spring from relieving its elastic action or reaction also on the clamp body, as for example shown in US 2014/124306 A1 and US6719105B1 by Kelsey-Hayes Company.

In document JP 2012 189188 by AKEBONO BRAKE IND., in particular, in embodiment shown in FIG. 12 (A and B), the spring moves the pads away from the disc resting it against the upper surface of the pad plates and elastically biases the edge between the plate and the friction material with the end of one of its arms placed radially. A similar solution is shown in JP2012072830A, WO 02/33282 and US 2018/023645 A1. However, these solutions do not guarantee a direct action of the spring substantially only in the axial direction.

In document DE 10 2017 222639 A1 by CONTINENTAL TEVES AG & CO OHG, the spring connects to the upper surface of plate ears and embraces the lower surface and the edges of these ears. In this solution, in order to embrace the outer, inner and lower surfaces of the lower edge of the plate ear with the objective of keeping the pad vertical, the spring is closed as a box on three sides about the lower edge of the plate and is forced to prevent a consequent rotation of the pad caused by actions having different directions in addition to the axial one to couple the upper edge of the ear of the plate with a snap-coupling (indicated by reference numeral 26), holding the plate in radial direction. A similar solution is known from US2004104086A1. These solutions, besides being very complex, do not guarantee a substantially axial spring action.

OBJECT OF THE PRESENT INVENTION

It is one of the main objects of the present invention to provide a solution and a method which allows the biasing of brake pads substantially and mainly with a direct resultant in an axial direction.

At the same time, the present invention relates to a solution which keeps the spring away from the disc under all conditions of use, i.e. under all conditions of brake pad wear.

At the same time, the present invention also relates to a solution which keeps the pads substantially with their friction surfaces parallel to the friction surfaces of the brake disc that they face.

It is a further object of the present invention to provide an improved pad spring and disc brake, having features which increase the flexibility of mounting springs to the disc brake, make the spring independent from the shape of the caliper body, reduce the size of the spring inside the caliper, and minimize the residual torque.

It is a further object of the present invention to provide an improved pad spring and disc brake, such as to improve, in the most barycentric sense, at least in a radial direction, the elastic action applied by the spring.

It is a further object of the present invention to provide an improved pad spring and a disc brake, such to balance the elastic actions applied on the two opposite pads.

SUMMARY

These and other objects are achieved by an assembly comprising two disc brake pads and at least one spring configured to elastically bias the pads, a caliper, by a disc brake, and a method of constantly and elastically biasing two opposite pads as described and claimed herein. Advantageous and preferred embodiments are also described.

By virtue of the suggested solutions, it is possible to bias the brake pads constantly and elastically facing the brake pads with an elastic bias action axially as direct as possible, thus avoiding to bias the pads with the spring by means of actions which a priori will certainly lead to angular actions or torques which can bias the correct position of the pads facing the disc as much as possible and with the friction surfaces of the friction material as parallel as possible to the friction surfaces of the brake disc.

Furthermore, by virtue of the suggested solutions, it is possible to keep the spring away from the disc even when the pads are under maximum wear conditions.

By virtue of the expected contact between the spring and the pad plates in their lower inner edge is limited to a point, or a line, allowing a better adjustment of the direction of action between the spring and the pad plate.

In further detail, by virtue of the suggested solutions, the spring is constantly connected to the pads as the wear varies, i.e. according to the variation of the distance between the two pads 6, and therefore of the distance between the two portions of the spring attachment to the pads. It is also ensured that the forces applied by the spring on the plate are only axial (perpendicular to the plane of symmetry in the figures indicated with reference numeral 16) and that no torques are applied which could cause the rotation of the plate itself. The spring system on the plate is configured as a hinge.

Furthermore, the inclinations of the spring arms are such that the spring is parallel to the surface of the disc under maximum wear conditions, thus avoiding contact of the spring with the disc.

The shape of the second connection 24 ensures that the spring can be taken to the maximum wear condition with the sliding connection sections on the inner upper edge and the upper surface of the plate coupling seat.

By virtue of the hook 23, the spring is prevented from slipping out of the caliper in a radial direction (parallel to the symmetry axis 16) under the condition of maximum wear of the pads. However, this hook does not work to attach the plate externally, remaining facing the lower edge of the plate itself and mostly not in contact under conditions of normal use.

DRAWINGS

In order to better understand the invention and appreciate the advantages thereof, some non-limiting exemplary embodiments will be described below with reference to the accompanying drawings, in which.

FIGS. from 16 to 18 diagrammatically show from the circumferential direction an assembly of two pads biased by a spring and facing a brake disc under three different conditions of wear of the pad friction material.

FIGS. from 19 to 22 diagrammatically show a spring connected to a plate coupling portion in which four different pad positions are illustrated, as a function of four different conditions of wear of the friction material not shown, to highlight the actions which are exchanged by the spring to the plate coupling portion.

DETAILED DESCRIPTION OF SOME EMBODIMENTS OF THE INVENTION

With reference to the figures, a disc brake, in particular for use on motor vehicles, is globally indicated by reference numeral 1. In the specific case, it is a disc brake of the floating caliper type. However, the invention is also applicable to brakes with fixed calipers.

Figure 1:
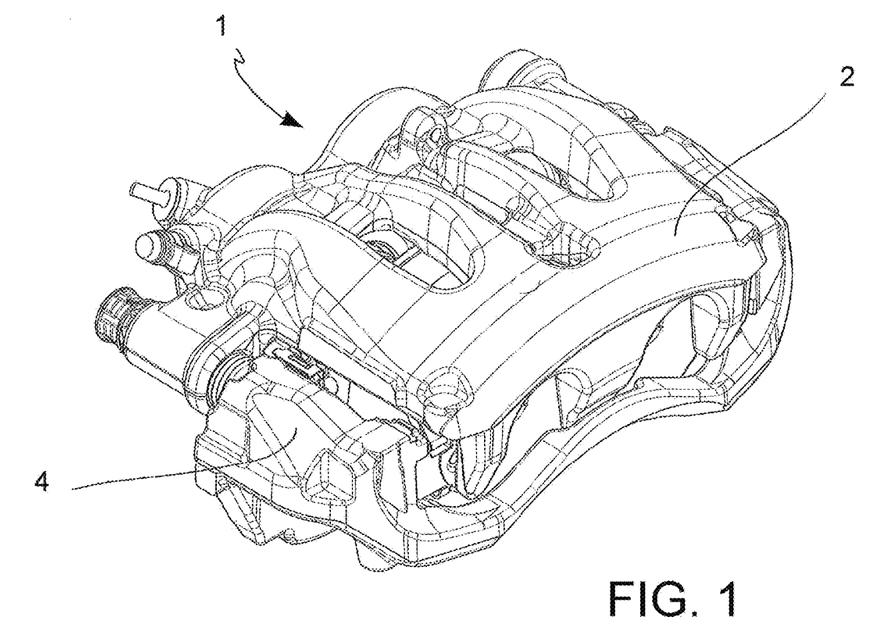
FIG. 1 is a perspective view of a disc brake according to an embodiment of the invention.
Figure 2:
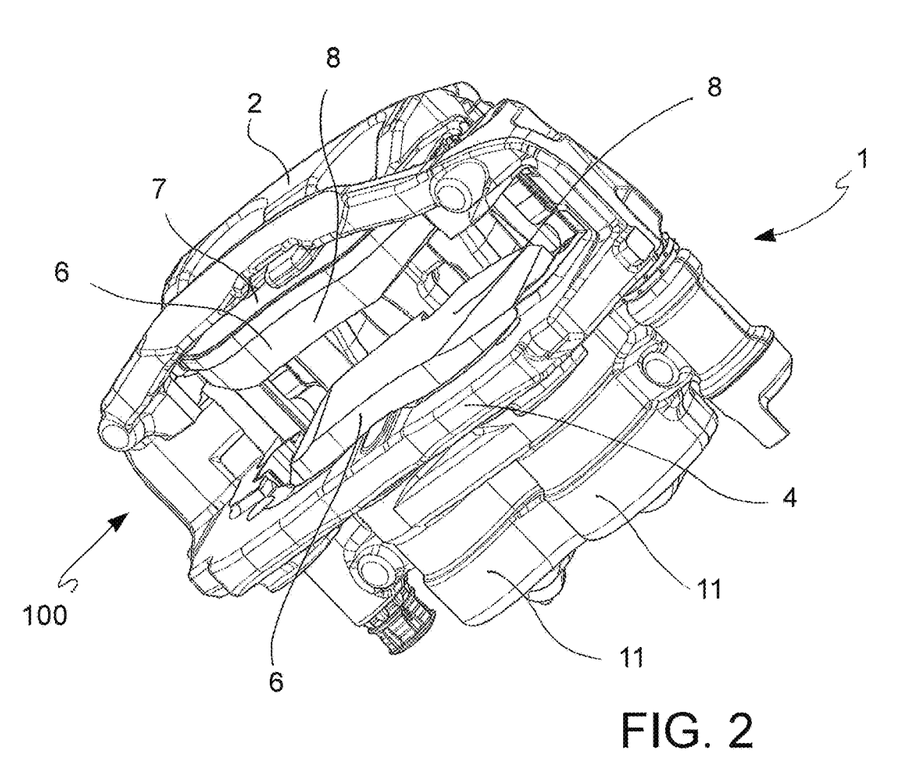
FIG. 2 is a further perspective view of the disc brake in FIG. 1.

The disc brake 1 comprises a caliper 2 and a brake disc 3, in which the brake disc 3 defines a rotation axis 10. The caliper 2 is arranged straddling the brake disc 3 and can be fixed to a bracket 4 by means of a sliding support (e.g. FIG. 1-2).

The bracket 4 is fixed to a vehicle suspension, while the brake disc 3, provided with an annular braking band 5, can be connected to the wheel hub of the vehicle (not shown).

Figure 3:
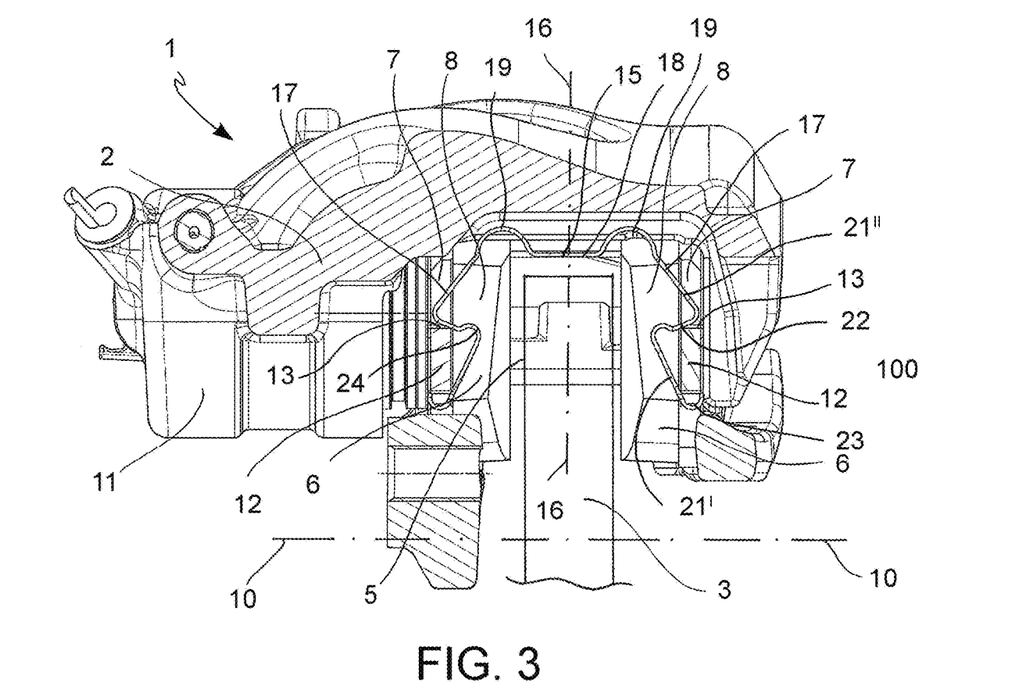
FIG. 3 is a radial section view (with respect to a rotation axis of a disc brake) of the disc brake in FIG. 1 under non-worn pad condition.
Figure 4:
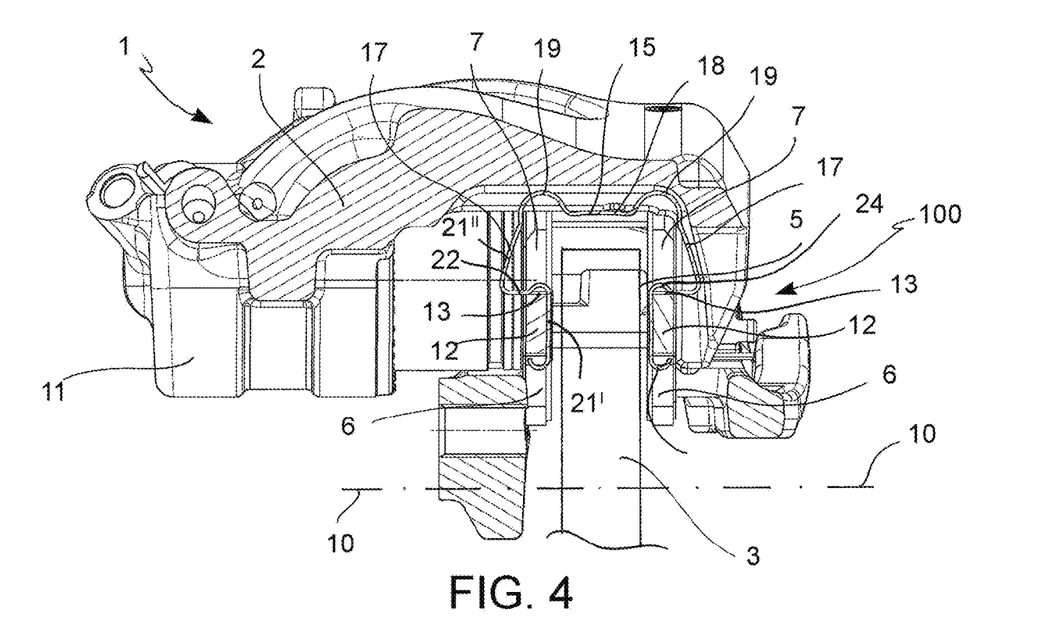
FIG. 4 is a further radial section view of the disc brake in FIG. 1, under worn pad condition.
Figure 5:
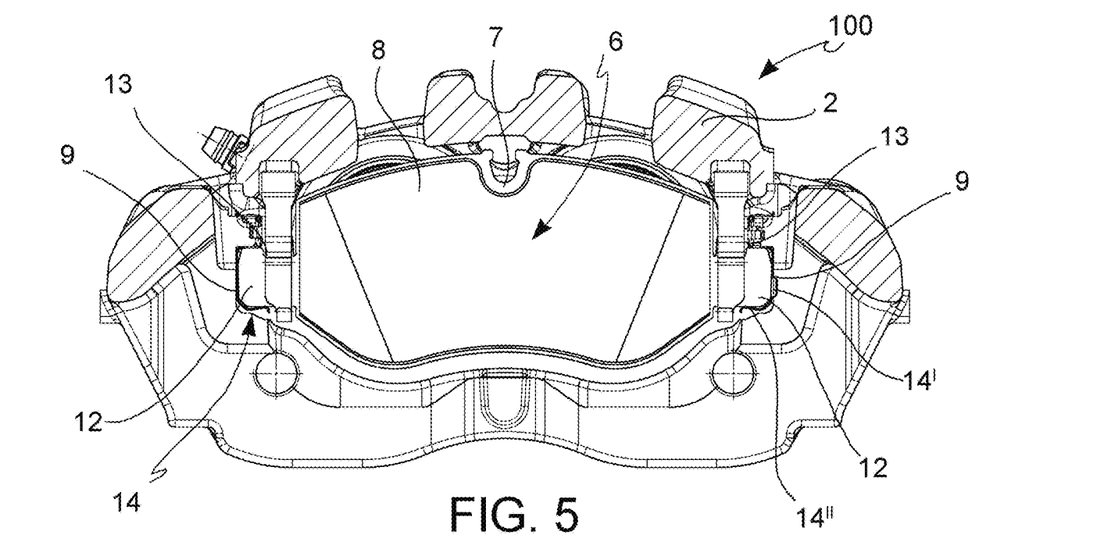
FIG. 5 is a cross-section view (with respect to a rotation axis of a disc brake) of the disc brake in FIG. 1.

The disc brake 1 comprises an assembly 100, wherein the assembly 100 comprises at least two pads 6 having a support plate 7 and a friction material coating 8, each of said at least two pads 6 is adapted to be accommodated in an appropriate pocket 9 of a caliper 2 so that each of said at least two pads 6 can be positioned on a side of a brake disc 3 of a disc brake 1 (e.g. FIG. 3-5).

The pads 6 can be displaced mainly in axial direction (parallel to the rotation axis 10 of the brake disc 3) towards the brake disc 3 by means of thrust means, e.g. such as one or more hydraulic cylinder-piston units 11 arranged in the caliper 2, so as to clamp, via the friction material 8, a sector of the braking band 5, the surface and shape of which corresponds to those of the friction lining 8.

The support plate 7 of the pads 6 has a substantially rectangular shape and forms two ears 12 protruding outwards from the support plate 7.

Figure 6:
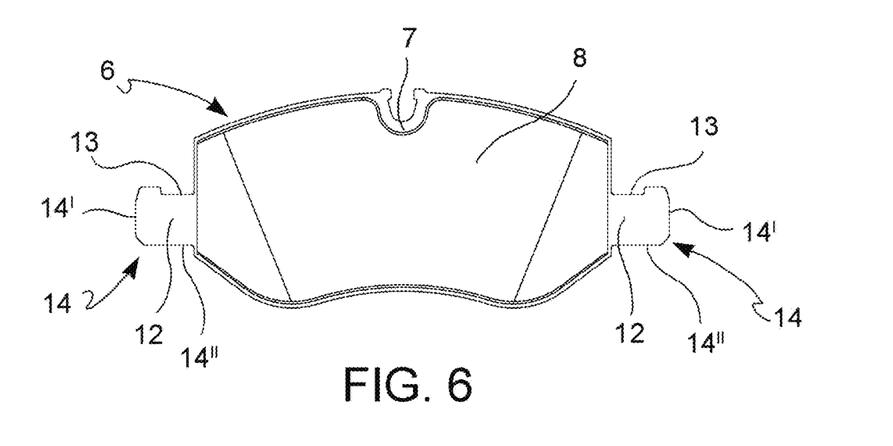
FIG. 6 is a front view of a pad of the disc brake in FIG. 1.
Figure 7:
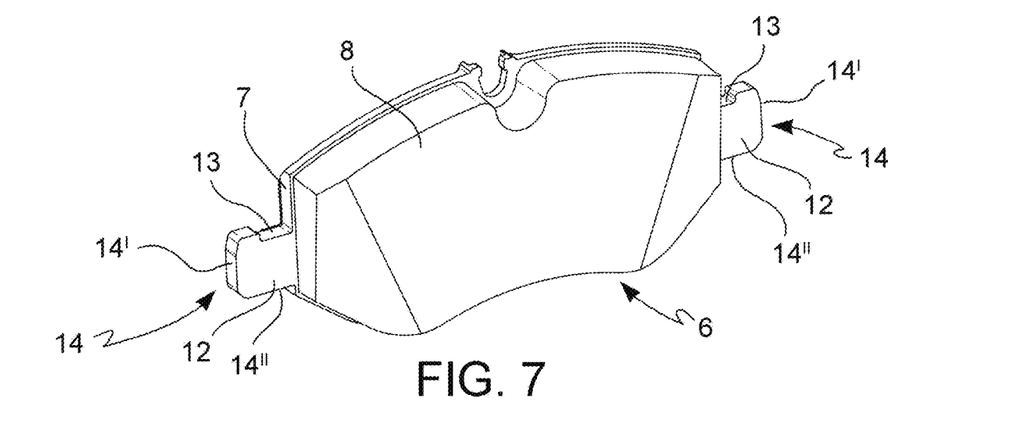
FIG. 7 is a perspective view of the pad in FIG. 6.

Each one of the two ears 12 forms an abutment wall 14 adapted to be inserted in the pockets 9 of the caliper 2. Advantageously, the abutment wall 14 has an angular shape, forming a first abutment wall 14' and a second abutment wall 14" adapted to abut against a plate mounted on two different surfaces of a pocket 9 of the caliper 2 (e.g. FIG. 5-7).

Furthermore, each of the ears 12 forms a coupling seat 13.

Furthermore, the assembly 100 further comprises at least one spring 15 shaped to be positioned straddling the brake disc 3, and which applies an elastic preload on the pads 6 so as to bias the pads 6 elastically away from the brake disc 3.

The at least one spring 15 may perform the further function of stopping the pads 6 elastically in the pockets 9 so as to reduce the onset of vibrations and noise due to movements of the pads with respect to the caliper 2.

According to an aspect of the invention, the spring 15 is configured so as to be directly connected only to the pads 6 (FIG. 3-5). Therefore, the spring 15 is not constrained by any other disc brake component 1 except for the pads 6.

Advantageously, such a configuration increases the assembly flexibility of the at least one spring 15 to the disc brake 1 because the at least one spring 15 is connected exclusively to the pads 6, and thus may be implemented indifferently to various disc brakes 1 and various calipers 2, with no need to adapt such disc brakes 1 or such calipers 2 to the spring 15 or vice versa.

With further advantage, such a configuration of the spring 15 is space-saving, because it makes up for the formation on the caliper 2 of a specific connection portion for the spring 15.

According to a further aspect of the invention, two springs 15 are arranged straddling the brake disc 3, so as to apply an elastic preload on the pads 6.

Specifically, each of the two springs 15 is connected to the ear 12 of a first pad 6 and to the corresponding opposite ear 12 of the other pad 6, respectively.

Figure 8:
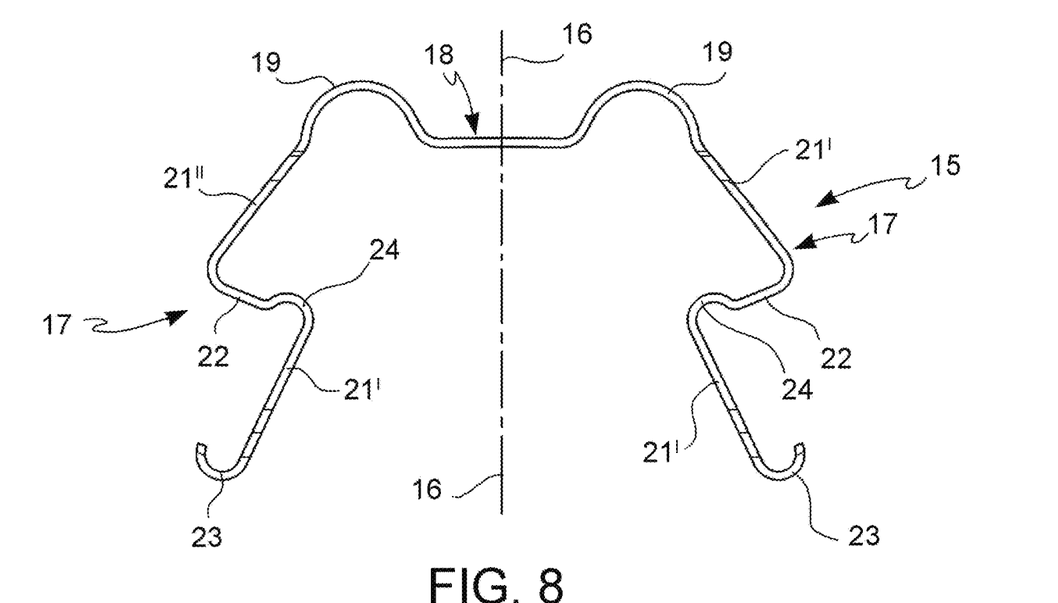
FIG. 8 is a front view of a spring of the disc brake in FIG. 1.
Figure 9:
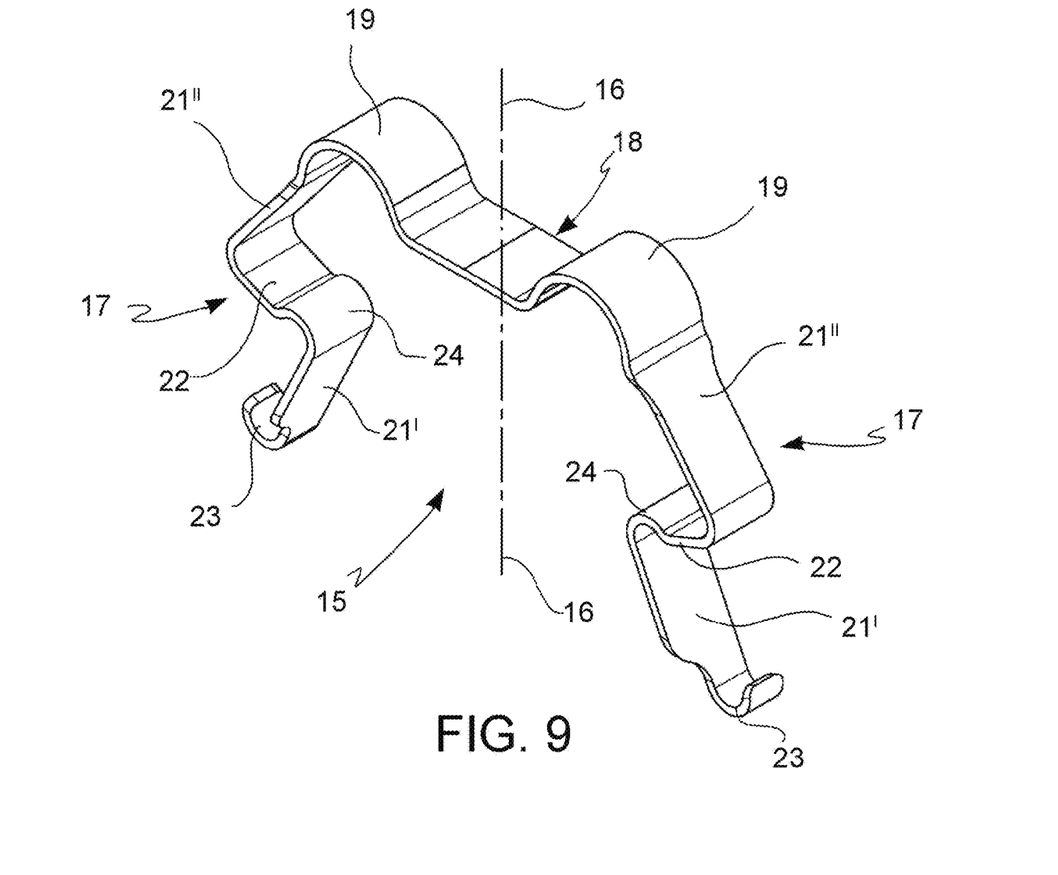
FIG. 9 is a perspective view of the spring in FIG. 8.
Figure 10:
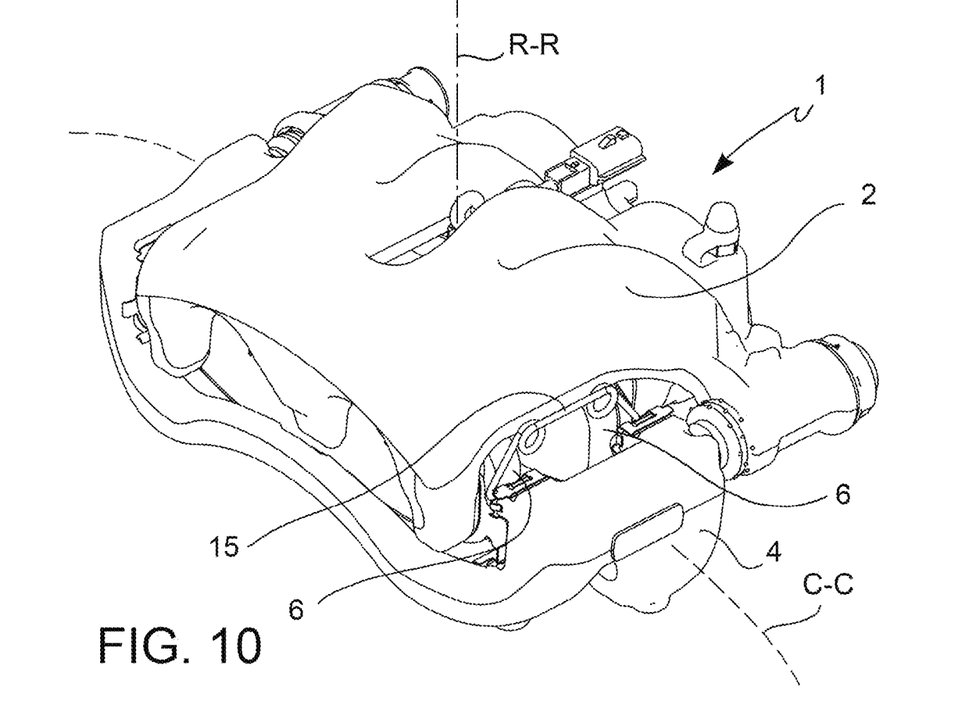
FIG. 10 shows a perspective side of a brake caliper according to a further embodiment.
Figure 11:
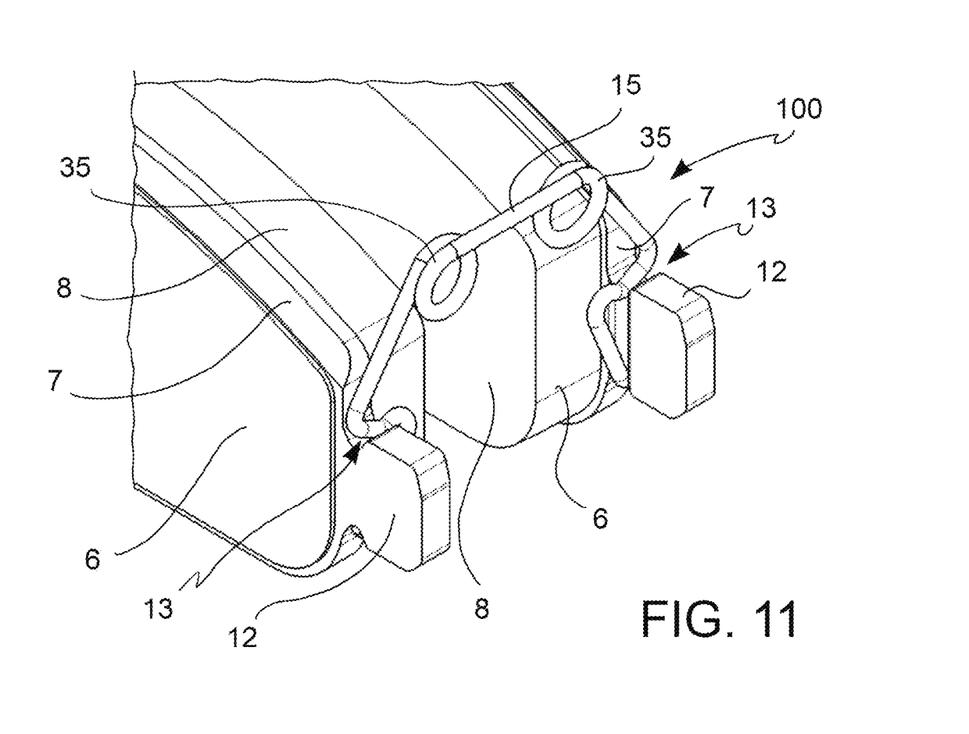
FIG. 11 is an axonometric view of a detail of an assembly of pads facing each other and an interposed spring associated therewith.
Figure 12:
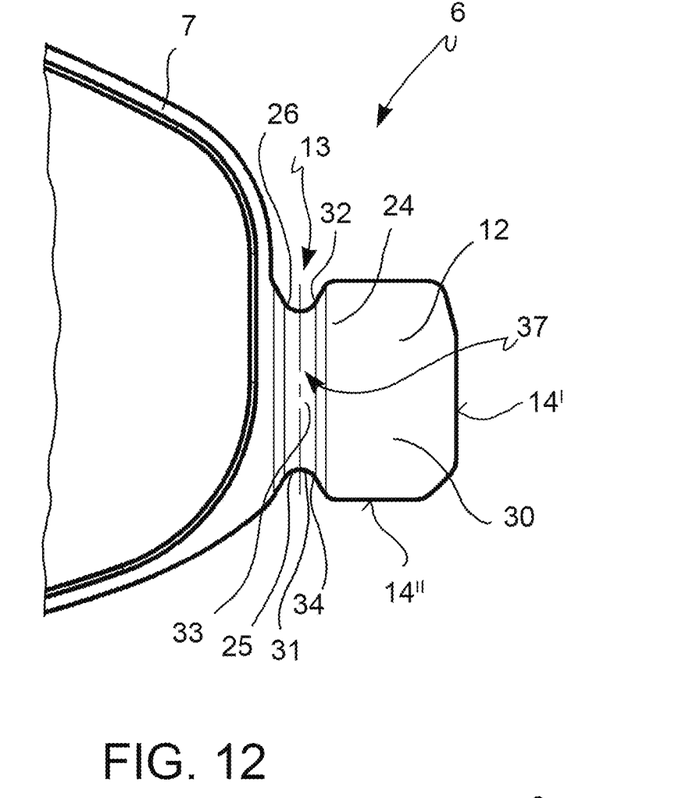
FIG. 12 is a front view of a detail of a brake pad according to a different embodiment, in which the detail of the coupling position of the brake pad to the spring is highlighted.
Figure 13:
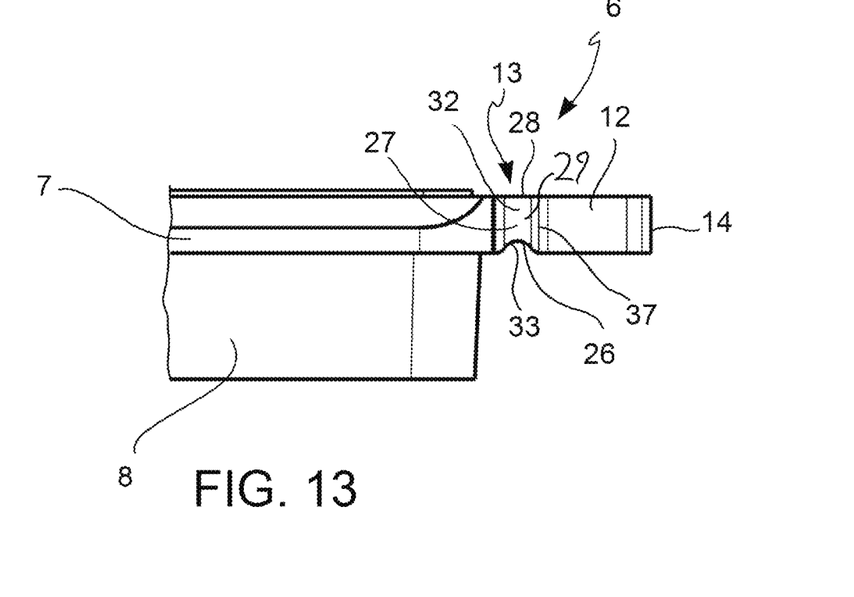
FIG. 13 is a top view of the detail in FIG. 12.
Figure 14:
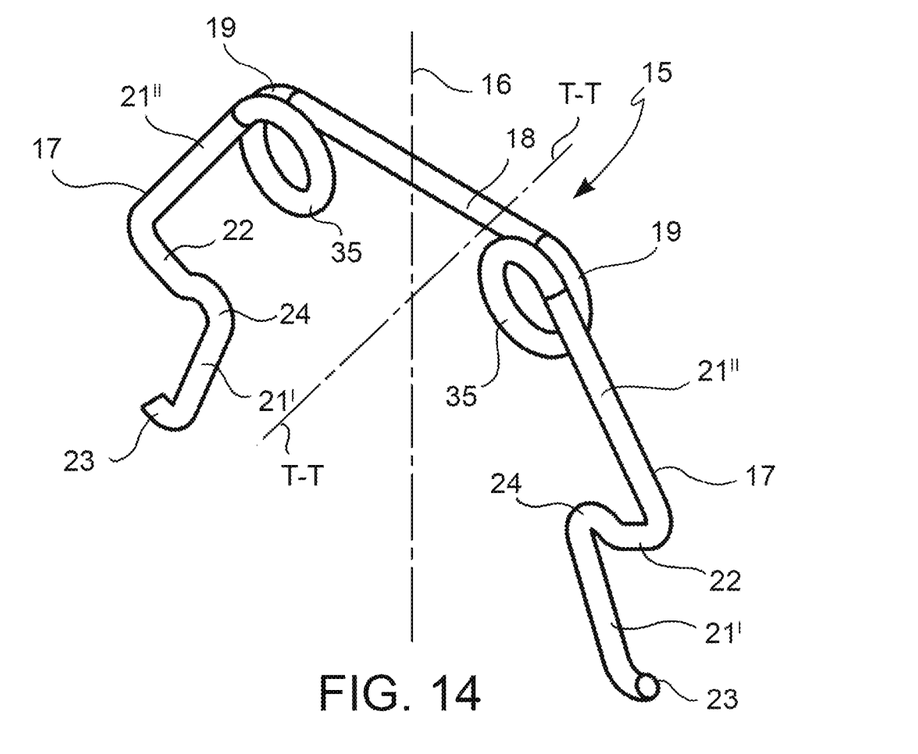
FIG. 14 shows an axonometric view of a spring according to a further embodiment.
Figure 15:
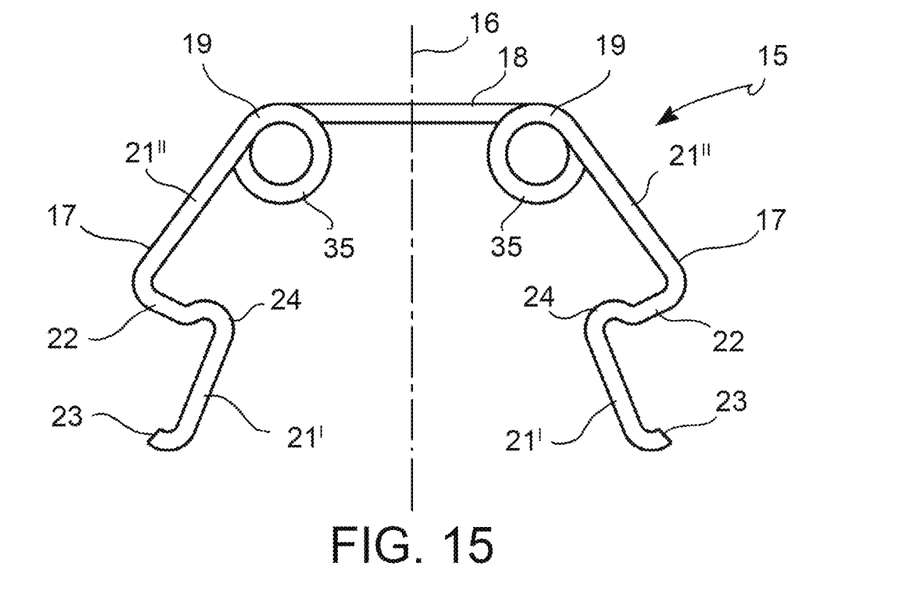
FIG. 15 is a front view of the spring in FIG. 14.
Figure 16:
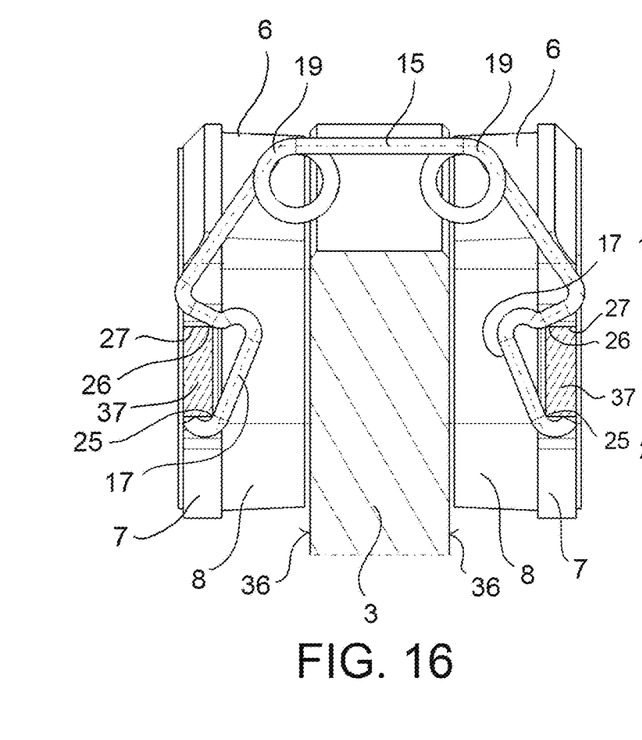
Figure 17:
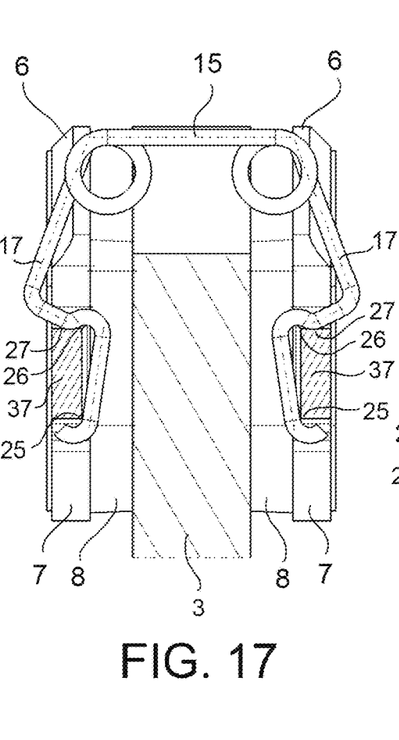
Figure 18:
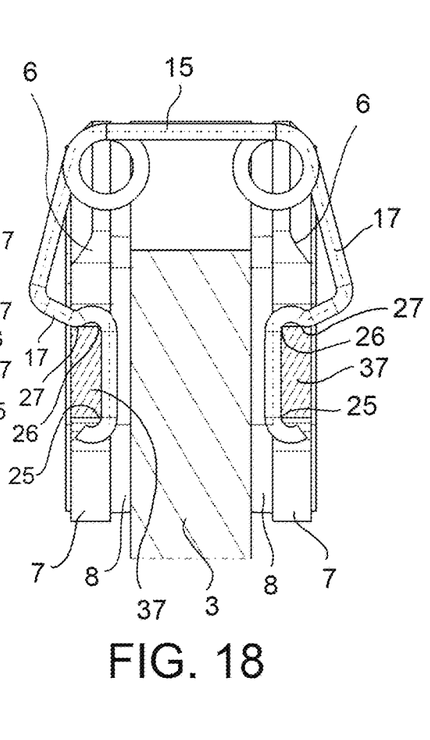
Figure 19:
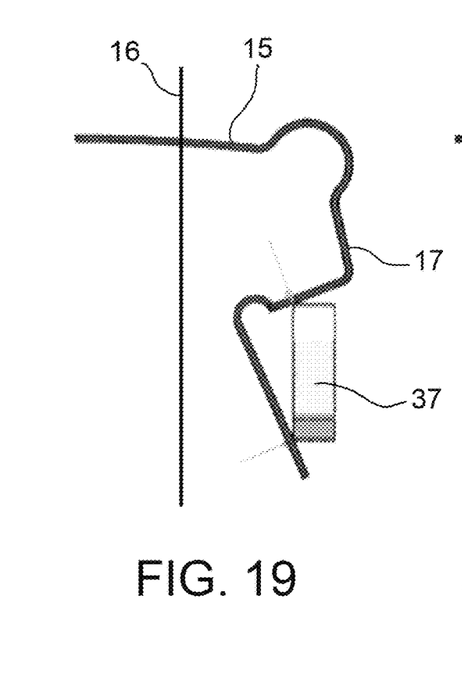
Figures 20, 21:
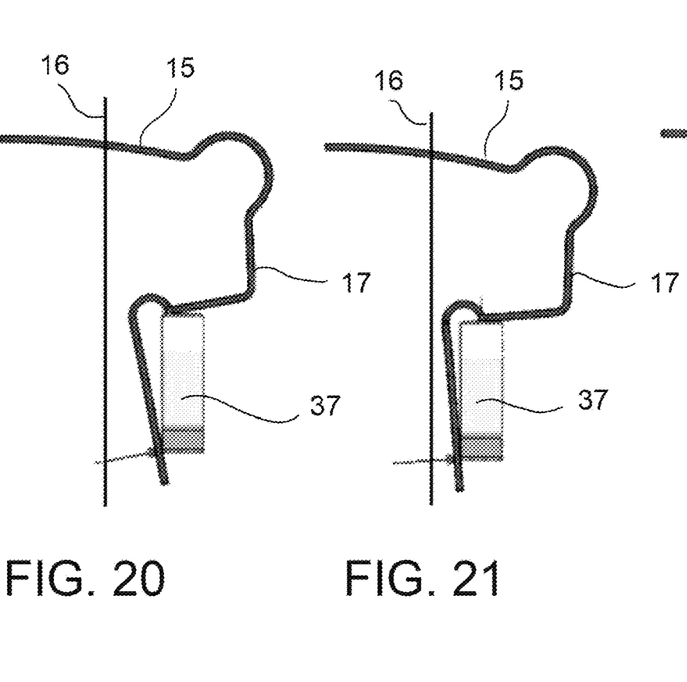
Figure 22:
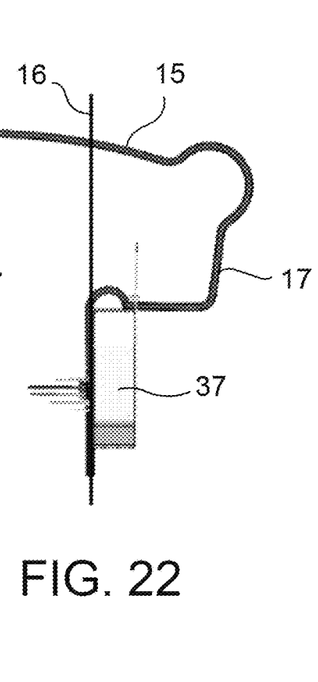
Figure 23:
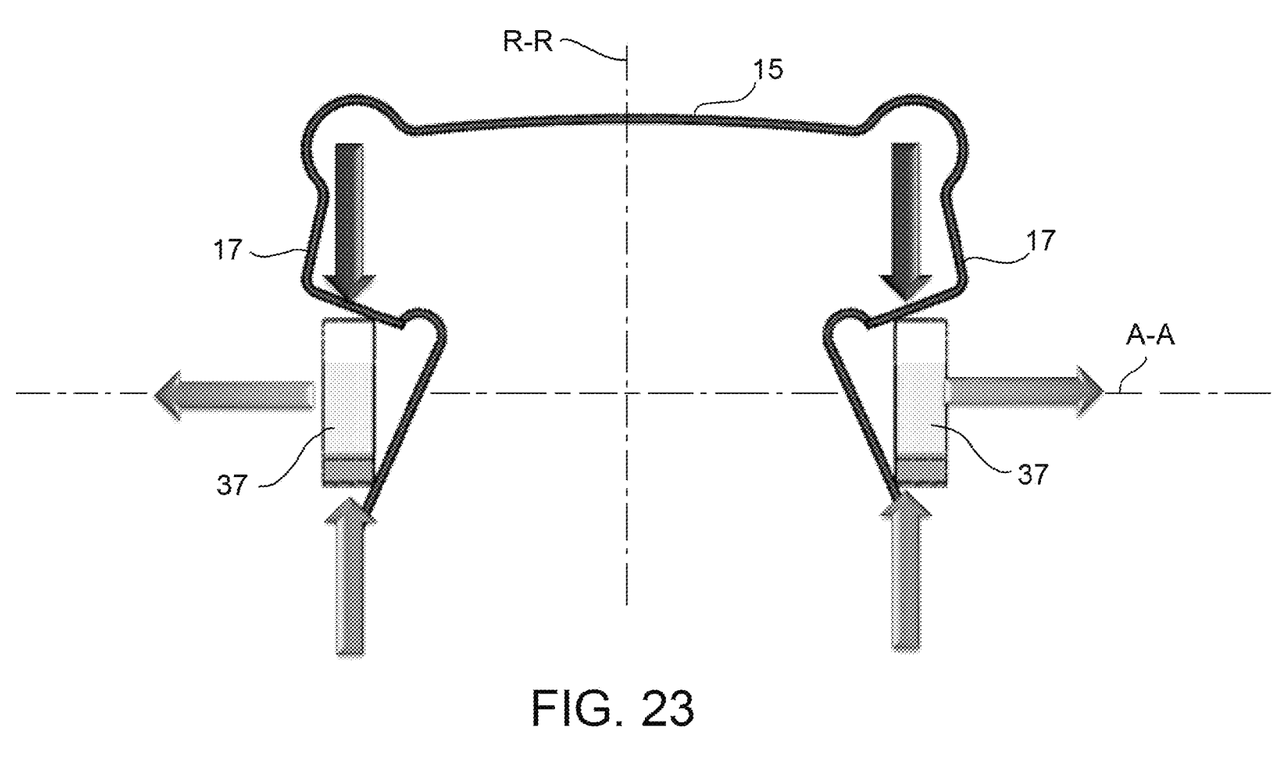
FIG. 23 diagrammatically shows a spring associated with two opposite plate coupling portions, in which the actions of the spring are broken down in radial and axial directions to show how the radial actions substantially compensate each other and the resulting are axial actions which constantly and elastically bias the pads as they move away from the disc.

According to an embodiment of the invention, at least one spring 15 is substantially shaped as an inverted "U" (FIG. 8-9).

The at least one spring 15 defines a symmetry plane 16 (geometric, not material) which is transverse to the rotation axis 10 of the brake disc 3 when at least one spring 15 is mounted in the operating position.

The at least one spring 15 consists of two coupling portions or spring arms 17 and of a bridge portion 18 interposed between the two coupling portions or spring arms 17.

The two coupling portions or spring arms 17 are configured to couple to a respective ear 12 of the two pads 6 and said two coupling portions or spring arms 17 are symmetrical with respect to the symmetry plane 16.

According to this embodiment, the spring 15 is deformed elastically (in particular, by accumulating elastic energy) by a relative movement of the coupling portions or spring arms 17, moved by the respective pads 6, with respect to the bridge portion 18.

According to an embodiment, each of the two coupling portions or spring arms 17 is connected to the bridge portion 18 by means of a first connector 19, wherein the first connector 19 is shaped as a loop or arc of circumference.

Advantageously, such a shape of the first connector 19 ensures that the elastic return force of the spring 15 (caused by the elastic deformation of the spring 15 by the action of the pads 6) is incremental as the wear of the pads 6 varies, i.e. as the distance between the two coupling pads 6 (and therefore the distance between the two coupling portions or spring arms 17 attached to the pads 6).

According to an embodiment, each of the coupling portions or spring arms 17 of the spring 15 is substantially "Z"-shaped.

In particular, each of the coupling portions or spring arms 17 consists of a first diagonal portion 21' and a second diagonal portion 21", which are substantially parallel to each other, between which a return portion 22, which is substantially transversal to the two first and second diagonal portions 21', 21", is interposed.

The return portion 22 is configured so as to lie on a respective coupling seat 13 of the ears 12.

Advantageously, such configuration of the return portion 22 guarantees that the spring 15 is constantly connected to the pads 6 when the wear of the pads 6 varies, i.e. with the distance between the two pads 6 (and therefore the distance between the two coupling portions or spring arms 17 coupled to the pads 6), and in particular when the pads 6 are new and the spring is very open (FIG. 3-4).

According to a further embodiment, the first diagonal portion 21' of each of the coupling portions or spring arms 17 is connected at a first end thereof to the return portion 22 by means of a second connector 24, wherein the second connector 24 is shaped as a loop or arc of circumference.

Advantageously, such a shape of the second connector 24 further ensures that the elastic return force of the spring 15 (caused by the elastic deformation of the spring 15 by the action of the pads 6) is incremental as the wear of the pads 6 varies, i.e. with the distance between the two coupling pads 6 (and therefore the distance between the two coupling portions or spring arms 17 attached to the pads 6) when the disc brake 1 is not actuated.

According to an embodiment, a second end of the diagonal portion 21' forms a hook-shaped end portion 23.

Advantageously, such a hooked end portion 23 further guarantees a correct and stable connection of the spring 15 to the ears 12 of the pads 6.

According to an embodiment, the spring 15 is configured so that, in the working position, the coupling portions or spring arms 17 are interposed between the pads 6 and the brake disc 3.

According to an embodiment, the spring 15 is of the leaf type.

According to a further embodiment, the spring 15 is formed in a single strip-shaped steel piece shaped so as to display only curvatures about axes which are substantially parallel to one another and substantially parallel to the symmetry plane 16 of the spring 15.

Advantageously, this simplifies the production process of spring 15, e.g. starting from sheet material, e.g. spring steel, which is sheared into strips and then bent and heat-treated to achieve its elastic return performance from said bent shape.

According to a further aspect of the invention, a caliper 2 comprises the assembly 100 described above.

According to an advantageous embodiment, the caliper 2 is of the "floating" type.

According to a further aspect of the invention, a disc brake 1 comprises the assembly 100 described above and the caliper 2 described above.

It is apparent that only some particular embodiments of the present invention have been described, to which those skilled in the art will be able to make all the changes required to adapt it to particular applications, without departing from the scope of protection of the present invention.

According to a general embodiment, an assembly 100 comprises at least two pads 6 having a support plate 7 and a friction material lining 8. Each of said at least two pads 6 is adapted to be accommodated in a pocket 9 of a caliper 2 so that each of said at least two pads 6 can be positioned on a side of a brake disc 3 of a disc brake 1 facing opposite braking surfaces 36.

Said brake disc 3 is a rotor adapted to rotate about a rotation axis 10 which defines an axial direction A-A, parallel to said rotation axis 10, a radial direction R-R, orthogonal to said rotation axis 10, and a circumferential direction C-C orthogonal to said axial A-A and radial R-R directions and a tangential direction T-T orthogonal to a radial R-R and circumferential C-C direction at their point of intersection.

Said assembly 100 further comprises at least one spring 15, shaped to be arranged straddling the disc brake 3.

Said spring 15 applies an elastic bias on the pads 6 so as to bias the pads 6 elastically away from the brake disc 3.

Said at least one spring 15 is configured to be directly connected only to the pads 6.

Said support plate 7 comprises at least one plate coupling portion 37.

In a section of said plate coupling portion 37 on a plane containing the axial direction A-A and the radial direction R-R, said plate coupling portion 37 comprises:
an inner lower edge 25, adapted to face the brake disc 3 in the radially inward direction or towards the disc rotation axis 10;
an inner upper edge 26, adapted to face the brake disc 3 in the radially outward direction or opposite to the disc rotation axis 10.

Said inner upper edge 26 continues on a direct upper surface 27 according to an axial direction A-A parallel to said disc rotation axis 10, thus forming an upper spring-coupling plate portion edge 29.

Advantageously, said spring 15 is always in contact exclusively with:
said inner lower edge 25
and
said upper spring-coupling plate portion edge 29.

According to an embodiment, said spring 15 is a wire spring made in one piece.

According to an embodiment, said spring 15 is a wire spring having a circular cross-section.

According to an embodiment, said spring 15 is a wire spring made in one piece and said spring 15 is always in contact exclusively with a point or a line of said inner lower edge 25 and said upper spring-coupling plate portion edge 29.

According to an embodiment, said inner upper edge 26 is radially arranged on the side opposite to said inner lower edge 25.

Said inner upper edge 26 continues on a direct upper surface 27 according to an axial direction A-A parallel to said disc rotation axis 10.

Said upper surface 27 continues on an outer upper edge 28 adapted to be rotated in the opposite direction to the brake disc 3.

Said spring 15 is always in contact with said upper inner edge 26 or said upper surface 27 or said upper outer edge 28.

According to an embodiment, said spring 15 avoids resting on anything else but said at least two pads 6, thus avoiding the connection to said caliper 2 for relieving all or part of the elastic reaction thereon.

According to an embodiment, said assembly 100 comprises two springs 15 adapted to be arranged straddling the brake disc 3, so as to bias the pads 6 elastically and wherein both said two springs 15 are configured to be directly connected only to the pads 6.

According to an embodiment, said two springs 15 are disconnected at opposite sides of said two pads 6.

According to an embodiment, the support plate 7 of the pads 6 is substantially rectangular in shape, said support plate 7 forms two ears 12 which extend towards the outside of the support plate 7 in circumferential direction C-C.

According to an embodiment, said at least one spring 15 cooperates with at least one of said ears 12.

According to an embodiment, each of the two ears 12 forms:
an abutment wall 14, adapted to be abuttingly inserted into the pockets 9 of the caliper 2, wherein the abutment wall 14 is angular in shape, thus forming a first abutment wall 14' and a second abutment wall 14" adapted to abut against metal sheets mounted to two different surfaces of a pocket 9 of the caliper 2; and
a coupling seat 13.

According to an embodiment, each of the two springs 15 is connected to the ear 12 of a first pad 6 and to the ear 12 of the other pad 6, respectively, either directly or indirectly facing said first pad ear 12.

According to an embodiment, said at least one plate coupling portion 37 comprises said upper spring-coupling plate portion edge 29, an inner pad coupling portion side 30, configured to face either directly or indirectly said brake disc 3, and a lower spring-coupling plate portion edge 31 comprising said inner lower edge 25 which continues on a lower surface 31 directed according to an axial direction A-A parallel to said disc rotation axis 10.

According to an embodiment, said upper spring-coupling plate portion edge 29 comprises an upper spring seat edge 32 shaped to fit intimately with a coupling portion or spring arms 17.

According to an embodiment, said lower spring-coupling plate portion edge 31 comprises a lower spring seat edge 34 shaped to fit intimately with a coupling portion or spring arms 17.

According to an embodiment, said inner pad coupling portion side 30 comprises an inner spring seat side 33 shaped to fit intimately with a coupling portion or spring arms 17.

According to an embodiment, the at least one spring 15 is substantially inverted "U"-shaped, and said at least one spring 15 defines a symmetry plane 16.

According to an embodiment, the at least one spring 15 comprises two coupling portions or spring arms 17 and of a bridge portion 18, said bridge portion 18 being interposed between the two coupling portions or spring arms 17.

According to an embodiment, said coupling portions or spring arms 17 are configured to be coupled to a respective ear 12 of the two pads 6.

According to an embodiment, said two coupling portions or spring arms 17 are symmetrical with respect to the symmetry plane 16.

According to an embodiment, the spring 15 is elastically deformable by means of a relative movement of the coupling portions or spring arms 17, said coupling portions or spring arms 17 being movable by the respective pads 6, with respect to the bridge portion 18.

According to an embodiment, each of the two coupling portions or spring arms 17 is connected to the bridge portion 18 by means of a first connector 19, wherein said first connector 19 is shaped as a loop or arc of circumference.

According to an embodiment, said first connector 19 is spiral-shaped.

According to an embodiment, said first connection 19 is spiral-shaped with at least one first connection loop 35 forming an angle of at least 360 DEG.

According to an embodiment, each of the coupling portions or spring arms 17 of the spring 15 is substantially "Z"-shaped, and each of the coupling portions or spring arms 17 comprises:
 a first diagonal portion or first inclined portion 21';
 a second diagonal portion or second inclined portion 21";
 a return portion 22.

According to an embodiment, the first diagonal portion 21' and the second diagonal portion 21" are substantially parallel to each other, and the return portion 22 is interposed between the first diagonal portion 21' and the second diagonal portion 21", said return portion being substantially transverse to the first diagonal portion 21' and to the second diagonal portion 21".

According to an embodiment, the return portion 22 is configured so as to lie on a respective coupling seat 13 of the ears 12.

According to an embodiment, the first diagonal portion 21' of each of the coupling portions or spring arms 17 is connected at a first end thereof to the return portion 22 by means of a second connector 24, wherein the second connector 24 is shaped as a loop or arc of circumference.

According to an embodiment, a second end of the diagonal portion 21' forms a hook-shaped end portion 23.

According to an embodiment, the spring 15 is configured so that, in the working position, the coupling portions or spring arms 17 are interposed between the pads 6 and the brake disc 3.

According to an embodiment, the spring 15 is of the wire type.

According to an embodiment, the spring 15 is a spring leaf.

According to an embodiment, the spring 15 is formed in a single strip-shaped steel piece shaped so as to display only curvatures about axes which are substantially parallel to one another and substantially parallel to the symmetry plane 16 of the spring 15.

The present invention further relates to a caliper 2 comprising an assembly 100, said assembly 100 comprising at least two pads 6 and at least one spring 15 according to any one of the embodiments described above.

According to an embodiment, the at least one spring 15 is configured to perform the further function of stopping the pads 6 elastically in the pockets 9 so as to reduce the onset of vibrations and noise due to movements of the pads with respect to the caliper 2.

According to an embodiment, said caliper body 2 is of the "floating" type.

The present invention further relates to a disc brake 1 comprising:
 an assembly 100 comprising at least two pads 6 and at least one spring 15 according to any one of the embodiments described above;
 a caliper 2; and
 a brake disc 3.

The present invention further relates to a method for biasing two facing brake pads 6 constantly and elastically by means of a spring 15, wherein there are provided the steps of:
 providing an assembly according to any one of the embodiments described above; and
 during wear of the friction material 8 of the pads 6, rotating the spring 15 like a hinge about the spring-coupling plate portion 37, sliding the spring 15 against said inner lower edge 25 and said upper spring-coupling plate portion edge 29 to apply an elastic bias for distancing the pads 6 from the brake, when the braking action ceases, substantially globally directed in the axial direction A-A.

LIST OF REFERENCE SYMBOLS

1. Disc brake
2. Caliper
3. Brake disc
4. Bracket
5. Braking band
6. Pads
7. Support plate
8. Friction material
9. Pockets
10. Rotation axis (of the brake disc)
11. Hydraulic cylinder-piston
12. Ears (of the pads)
13. Coupling seats
14. Abutment wall
14'. First abutment wall
14". Second abutment wall
15. Spring
16. Symmetry plane (of the spring)
17. Coupling portion or spring arm
18. Bridge portion
19. First connector
21'. First diagonal portion or first inclined portion
21". Second diagonal portion or second inclined portion
22. Return portion
23. Hook-shaped end portion
24. Second connector
25. Inner lower edge
26. Inner upper edge
27. Upper surface
28. Outer upper edge
29. Upper edge of plate coupling portion to the spring
30. Inner pad coupling portion side
31. Lower spring-coupling plate portion edge
32. Upper edge spring seat 33. Inner side spring seat
34. Lower edge spring seat
35. First connection loop
36. Disc brake braking surfaces
37. Plate coupling portion to the spring
100. Pad-spring assembly
A-A axial direction
R-R radial direction
C-C circumferential direction
T-T tangential direction

The invention claimed is:

1. An assembly comprising:
at least two pads having a support plate and a friction material coating, each of said at least two pads being adapted to be accommodated in a pocket of a caliper so that each of said at least two pads is positionable on a side of a brake disc of a disc brake facing opposite braking surfaces;
said brake disc being a rotor configured to rotate about a disc rotation axis defining an axial direction (A-A), parallel to said disc rotation axis, a radial direction (R-R), orthogonal to said disc rotation axis, and a circumferential direction (C-C) orthogonal to said axial (A-A) and radial (R-R) directions and a tangential direction (T-T) orthogonal to the radial (R-R) and circumferential (C-C) directions at their point of intersection;
at least one spring, arranged straddling the brake disc,
wherein said at least one spring applies an elastic bias on the at least two pads so as to elastically bias the at least two pads away from the brake disc;
wherein said at least one spring is configured to be directly connected only to the at least two pads;
said support plate comprising at least one plate coupling portion,
wherein, in a section of said at least one plate coupling portion on a plane containing the axial direction (A-A) and the radial direction (R-R), said at least one plate coupling portion comprises:
an inner lower edge, configured to face the brake disc in a radially inward direction or towards the disc rotation axis;
an inner upper edge, configured to face the brake disc in a radially outward direction or opposite to the disc rotation axis;
said inner upper edge continues on an upper surface directed according to the axial direction (A-A) parallel to said disc rotation axis, forming an upper spring-coupling plate portion edge;
and wherein said at least one spring is always in contact exclusively with:
said inner lower edge, and
said upper spring-coupling plate portion edge.

2. The assembly of claim 1, wherein said at least one plate coupling portion comprises said upper spring-coupling plate portion edge, an inner pad coupling portion side, configured to face either directly or indirectly said brake disc, and a lower spring-coupling plate portion edge comprising said inner lower edge that continues on a lower surface directed according to the axial direction (A-A) parallel to said disc rotation axis.

3. The assembly of claim 2, wherein said upper spring-coupling plate portion edge comprises an upper spring seat edge configured to intimately fit with a coupling portion or spring arm.

4. The assembly of claim 2, wherein said lower spring-coupling plate portion edge comprises a lower spring seat edge configured to intimately fit with a coupling portion or spring arm.

5. The assembly of claim 2, wherein said inner pad coupling portion side comprises an inner spring seat side configured to intimately fit with a coupling portion or spring arm.

6. A caliper comprising an assembly, said assembly comprising at least two pads and at least one spring according to claim 1.

7. The caliper of claim 6, wherein the at least one spring is configured to elastically stop the at least two pads in pockets so as to reduce onset of vibrations and noise due to movements of the at least two pads with respect to the caliper.

8. The caliper of claim 6, wherein the caliper is a floating type caliper.

9. The assembly of claim 1, wherein the support plate of the at least two pads is rectangular in shape and forms two ears extending towards outside of the support plate in circumferential direction (C-C); and wherein said at least one spring cooperates with at least one of said two ears.

10. The assembly of claim 9, wherein each of the two ears forms:
an abutment wall, configured to be abuttingly inserted into pockets of the caliper, wherein the abutment wall is angular in shape, forming a first abutment wall and a second abutment wall configured to abut against two different surfaces of a pocket of the caliper; and
a coupling seat;
and wherein
each of the two springs is connected to an ear of a first pad and to the ear of the other pad, respectively, either directly or indirectly facing the ear of said first pad.

11. The assembly of claim 1, wherein the at least one spring is inverted U-shaped, and said at least one spring defines a symmetry plane;
and wherein
the at least one spring comprises two coupling portions or spring arms and a bridge portion, said bridge portion being interposed between the two coupling portions or spring arms,
and wherein said two coupling portions or spring arms are configured to be coupled to a respective ear of the at least two pads,
and wherein said two coupling portions or spring arms are symmetrical with respect to the symmetry plane;
and wherein
the at least one spring is elastically deformable by a relative movement of the two coupling portions or spring arms, said two coupling portions or spring arms being movable by respective pads, with respect to the bridge portion;
and wherein
each of the two coupling portions or spring arms is connected to the bridge portion by a first connector, wherein said first connector is shaped as a loop or arc of circumference;
or wherein said first connection is spiral-shaped;
or wherein said first connection is spiral-shaped with at least one first connection loop forming an angle of at least 360 DEG;

and wherein
each of the two coupling portions or spring arms is Z-shaped, and comprises:
a first diagonal portion or first inclined portion;
a second diagonal portion or second inclined portion;
a return portion;
and wherein the first diagonal portion and the second diagonal portion are parallel to each other, and
the return portion is interposed between the first diagonal portion and the second diagonal portion, said return portion being transverse to the first diagonal portion and to the second diagonal portion.

12. The assembly of claim 11, wherein the return portion is configured so as to lie on a respective coupling seat of the two ears;
and wherein
a first end of the first diagonal portion of each of the two coupling portions or spring arms is connected to the return portion by a second connector, wherein the second connector is shaped as a loop or arc of circumference;
and wherein
a second end of the first diagonal portion forms a hook-shaped end portion;
and wherein
the at least one spring is configured so that, in a working position, the two coupling portions or spring arms are interposed between the at least two pads and the brake disc;
and wherein
the at least one spring is a wire-type spring;
or wherein
the at least one spring is a leaf-type spring;
or wherein
the at least one spring is formed in a single strip-shaped steel piece so as to display only curvatures about axes parallel to one another and parallel to the symmetry plane.

13. The assembly of claim 1, wherein said at least one spring is a wire spring made in one piece;
or wherein said at least one spring is a wire spring having a circular cross-section;
or wherein said at least one spring is a spring in one piece;
wherein said at least one spring is always in contact exclusively with a point or a line of said inner lower edge and said upper spring-coupling plate portion edge.

14. The assembly of claim 1, wherein said inner upper edge is radially arranged on a side opposite to said inner lower edge; and wherein
said inner upper edge continues on the upper surface directed according to the axial direction (A-A) parallel to said disc rotation axis; and wherein
said upper surface continues on an outer upper edge; and wherein
said at least one spring is always in contact with said inner upper edge or said upper surface or said outer upper edge.

15. The assembly of claim 1, wherein:
said at least one spring avoids resting on anything but said at least two pads, avoiding connecting to said caliper for relieving all or part of an elastic reaction thereon;
said assembly comprises two springs configured to be arranged straddling the brake disc, to elastically bias the at least two pads and wherein both springs are configured to be directly connected only to the at least two pads; and wherein
said two springs are disconnected at opposite sides of said at least two pads.

16. A disc brake comprising:
an assembly, said assembly comprising at least two pads and at least one spring according to claim 1;
a caliper, wherein the at least one spring is configured to elastically stop the at least two pads in pockets so as to reduce onset of vibrations and noise due to movements of the at least two pads with respect to the caliper; and
a brake disc.

17. A method for constantly and elastically biasing two facing brake pads by a spring, the method comprising:
providing an assembly comprising:
at least two pads having a support plate and a friction material coating, each of said at least two pads being adapted to be accommodated in a pocket of a caliper so that each of said at least two pads is positionable on a side of a brake disc of a disc brake facing opposite braking surfaces;
said brake disc being a rotor configured to rotate about a disc rotation axis defining an axial direction (A-A), parallel to said disc rotation axis, a radial direction (R-R), orthogonal to said disc rotation axis, and a circumferential direction (C-C) orthogonal to said axial (A-A) and radial (R-R) directions and a tangential direction (T-T) orthogonal to the radial (R-R) and circumferential (C-C) directions at their point of intersection;
at least one spring, arranged straddling the brake disc,
wherein said at least one spring applies an elastic bias on the at least two pads so as to elastically bias the at least two pads away from the brake disc;
wherein said at least one spring is configured to be directly connected only to the at least two pads;
said support plate comprising at least one plate coupling portion,
wherein, in a section of said at least one plate coupling portion on a plane containing the axial direction (A-A) and the radial direction (R-R), said at least one plate coupling portion comprises:
an inner lower edge, configured to face the brake disc in a radially inward direction or towards the disc rotation axis;
an inner upper edge, configured to face the brake disc in a radially outward direction or opposite to the disc rotation axis;
said inner upper edge continues on an upper surface directed according to the axial direction (A-A) parallel to said disc rotation axis, forming an upper spring-coupling plate portion edge;
and wherein said at least one spring is always in contact exclusively with:
said inner lower edge, and
said upper spring-coupling plate portion edge;
connecting said at least one spring directly and exclusively to the at least two pads; and
during wear of the friction material coating, rotating the at least one spring like a hinge about the at least one plate coupling portion, sliding the at least one spring against said inner lower edge and said upper spring-coupling plate portion edge to apply an elastic bias distancing the at least wo pads away from a brake, when a braking action directed in the axial direction (A-A) ceases.

* * * * *